Aug. 3, 1937.  C. R. WAGNER  2,088,824
POLYMERIZATION OF HYDROCARBON GASES
Filed April 11, 1929
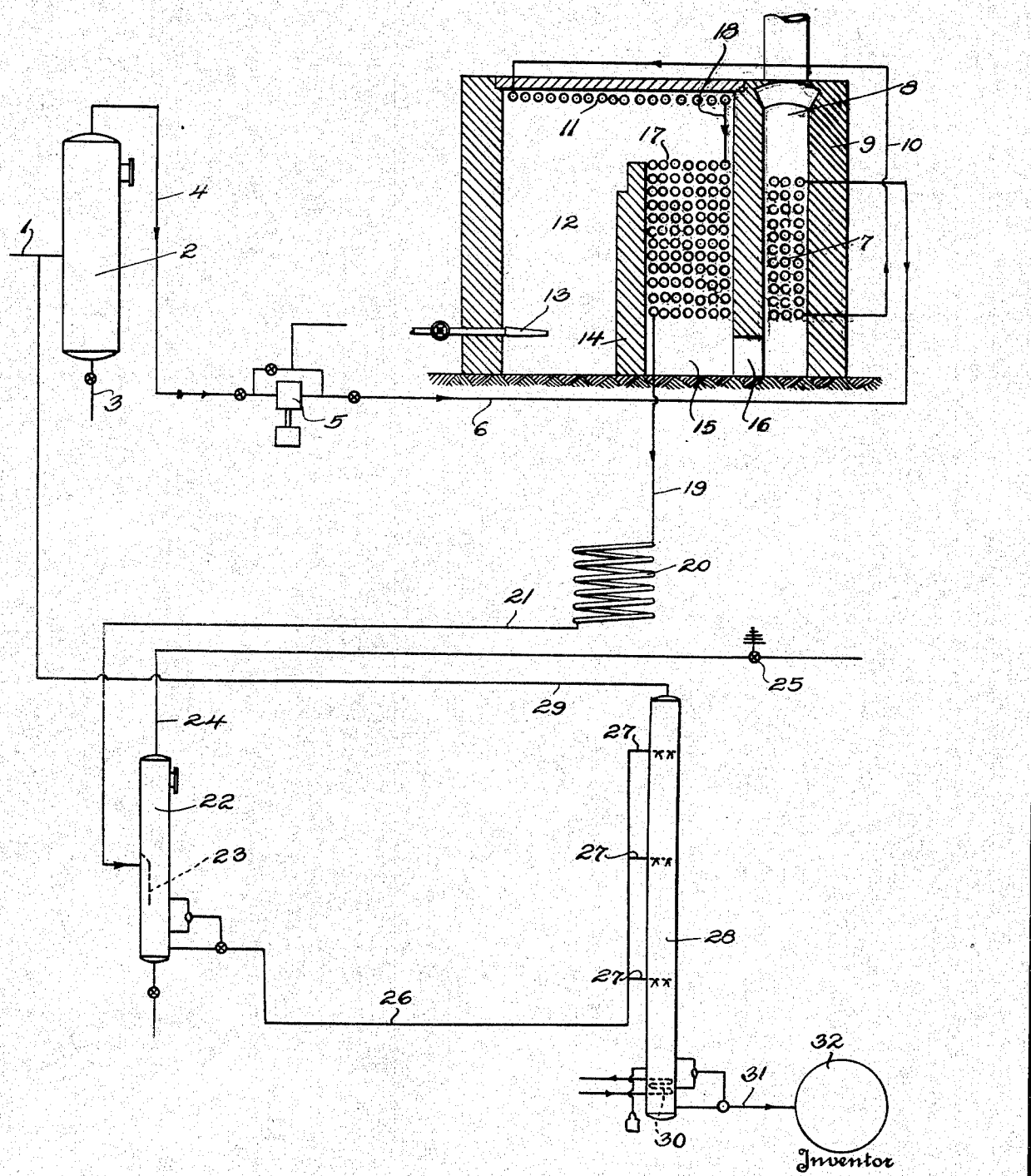
Inventor
Cary R. Wagner
By W. D. McDowell
Attorney Patented Aug. 3, 1937

2,088,824

UNITED STATES PATENT OFFICE 2,088,824

POLYMERIZATION OF HYDROCARBON GASES

Cary R. Wagner, Chicago, Ill., assignor to The Pure Oil Company, Chicago, Ill., a corporation of Ohio Application April 11, 1929, Serial No. 354,426

15 Claims. (Cl. 196—10)

This invention relates to the art of polymerizing hydrocarbon gases rich in olefines and is particularly directed to the recovery or formation of liquid hydrocarbons suitable for use as motor fuels from the gases produced in the operation of pyrolytic cracking operations.

In certain types of hydrocarbon cracking systems, particularly those employing high vapor temperatures during cracking, relatively large quantities of gas are produced which are apt to render the cracking system uneconomical to operate. It is customary in the operation of most cracking plants to subject the uncondensibles to the action of a compressor for the purpose of recovering the liquid content present in the gases. However, even after this operation a large quantity of gas remains to be disposed of. In many instances this disposal is relatively wasteful, it being customary to employ the gases as burner fuel or in certain instances to dispose of the gas by employing it as an enriching gas for artificially produced heating and illuminating gases.

It is therefore a primary object of the present invention to provide an improved system of effecting polymerization of the gases discharged from the compressor liquid recovery system of a cracking plant in order that by subjecting the gases to regulated conditions of temperature and pressure heavier compounds may be synthetically produced from a portion of said gases which at ordinary conditions of temperature and pressure may be recovered as liquids suitable for use as motor fuels and possessing many of the attributes of ordinary gasoline.

The invention further provides a system wherein the gas under treatment is passed through peculiarly arranged tubes of a heating still and under such conditions that when in said tubes the gases are subjected to temperatures varying between 800 to 1000° F. and while maintained under relatively high pressures, varying between 300 to 1000 pounds per square inch, preferably 550 to 800 pounds per square inch. Under these conditions polymerization of the gases takes place readily, either with or without the presence of a catalyst, such as iron oxide, and a very large percentage of the gas is polymerized and recovered as liquid motor fuel.

I have determined that polymerization reactions are of an exothermic character and give rise to vapor temperatures which if uncontrolled are materially higher than the desired optimum temperature. If temperatures of the gases undergoing polymerization reactions materially exceed 1000° F. there is a considerable deposit of free carbon and a decrease in the yield of the liquids of polymerization. Therefore, in my process I have provided a heater or still so formed as to include preheating and reaction sections, the reaction section being disposed in the high temperature zone of the still and the flow of the gases through the tubes of the reaction section is such that the hydrocarbon gases undergoing polymerization flow parallel or concurrently with the flow of the furnace gases through the still. This arrangement is such that when the hydrocarbon gases enter the reaction section at relatively low temperatures they are immediately exposed to the zone of highest furnace gas temperature in the still. Due to the transfer of heat between the furnace gases and the hydrocarbon gases the said furnace gases lose temperature rapidly, while on the other hand the temperature of the hydrocarbon gases increases rapidly, not only due to heat interchange with the furnace gases but due to the characteristic of the exothermic reactions produced. Therefore, in order to prevent the hydrocarbon gases from attaining an excessively high temperature the relatively cooler furnace gases operate in a measure to remove heat from the reaction section of the hydrocarbon gases in the outlet portion thereof. Thus there is maintained a balance by which the hydrocarbon gases are first heated by the burner gases to reaction temperatures and then through the medium of the furnace gases prevented from attaining an undesirably high temperature which, for present purposes, may be said to be materially in excess of 1000° F.

A further disclosure of the invention and understanding of the details thereof may be had by reference to the following description and the accompanying drawing wherein the figure is a diagrammatic view illustrating the apparatus used in carrying the present invention into operation.

In said drawing the numeral 1 designates a pipe line leading from the recovery plant of a cracking system. As previously indicated cracking systems, particularly the so-called vapor-phase systems, produce relatively large quantities of gas which contain valuable liquid products. This gas is therefore sent to the recovery plant where it is passed through the compressors for the purpose of separating the liquid constituents contained therein from the gaseous constituents. The present invention involves the treatment of the gases released from such recovery plants with the end in view of effecting polymerization of said gases and the development of other bodies of liquids suitable for use as gasoline. It will be understood, however, that the present invention may be operated in connection with gases obtained from other sources than cracking plants and I contemplate the application of the invention to all such additional uses.

The line 1 leads preferably to an accumulator tank 2 having a liquid draw-off line 3 in the bottom thereof. From the top of the tank 2 a pipe line 4 leads to a compressor 5 and in the line 4 the gas may be maintained at a temperature of approximately 20° F. and under pressures of 125 to 150 pounds per square inch. After being subjected to the action of a compressor the gas leaves the latter through a pipe line 6 at, for example, a temperature of 300° F. and at a pressure of approximately 1000 pounds per square inch. The gas is forced by way of the pipe line 6 into a bank of preheating tubes 7 which are positioned within the stack outlet 8 of a heater or still 9.

From the preheating tube 7 the gases flow by way of the line 10 to a horizontally arranged row of tubes 11 placed in the roof of the combustion chamber 12 of the heater which tubes are subjected in particular to the radiant heat developed within the chamber 12. A burner 13 of any desired type is situated in the lower portion of the chamber 12 and a bridge wall 14 arranged transversely in the setting of the heater separates the chamber 12 from a tube chamber 15, the latter being in communication with the outlet 8 by way of the opening 16. Arranged within the tube chamber 15 is a bank of tubes 17 which communicate with the tubes 11 by means of the pipe 18. Thus the gases after leaving the compressor 5 are subjected to the heat of the still by being passed, first, through the preheating tubes 7, thence through the roof tubes 11 and then through the final bank of tubes 17 and it is within the tubes 11 and 17 especially that the desired polymerization reactions take place.

The typical polymerization reaction is an exothermic one and therefore means must be provided for controlling this exothermic reaction. By passing the gases within the tubes comprising the reaction sections 11 and 17 parallel to the flow of the flue gases I secure this desired result. Initially, the temperature of the hydrocarbon gases within the reaction tubes will be below the temperature of the flue or furnace gases, and there will be some slight tendency for heat to be absorbed in the first passes or tubes of the reaction zone. As the reaction progresses, however, heat will be given off in a consistently increasing quantity, and the temperature of the reacting gases will rise until their temperature is equal to or above the temperature of the furnace or flue gases surrounding the tubes. Inasmuch as a very high temperature in these reacting hydrocarbon gases is undesirable, because of the attending formation of tars and free carbon, it is highly desirable that the temperature of the reaction should not go appreciably above 1000° F. Since the flue gases in this portion of the furnace, that is to say, in the chamber 15, will be considerably below this temperature they will act as a cooling medium preventing the reaction temperature of the hydrocarbon gases from going beyond desired limits. The apparatus described therefore gives a substantially automatic control of the temperature of reaction. Expressed in other words, the apparatus provides for maintaining a uniform temperature of reaction in exothermic reactions of hydrocarbon gases.

The tube bank 17 is in direct communication with an outlet pipe line 19 which leads to a cooling coil unit 20 which reduces the temperature of the gases and polymers to approximately 100° F. From the cooling unit 20 the gases and liquids flow by way of a pipe line 21 to a second accumulator tank 22 which is internally baffled as at 23. The top of the tank 22 is connected with a gas outlet line 24 by which the permanent gases are removed from the system. The line 24 may be provided with a pressure reducing valve 25 and leads to a gas tank, burner, such as a burner 13, or other zone of storage or utilization. The liquids accumulate in the bottom of the tank 22 and are withdrawn by way of a pipe line 26 provided with a pressure releasing valve 26'. The end of the line 26 contains a plurality of branches 27 which enter a stabilizing tank 28 which is adapted to weather or stabilize the liquids by removing therefrom excessively volatile compounds in the form of vapors or gases, particularly propylene or butylene fractions, the latter being discharged from the top of the tank 28 by way of a pipe line 29 which leads to the pipe line 1 providing for the re-circulation of such volatiles through the system and repeated treatment thereof. The bottom of the tank 28 may be provided with a re-boiler coil 30 and with a draw-off line 31 leading to a storage tank or the like 32.

The above system provides a practical and economical method and means for treating hydrocarbon gases so as to obtain therefrom the maximum quantity of liquid suitable for use as gasoline. Particularly, the present invention eliminates a loss in liquid motor fuel which now normally obtains in present systems utilizing gases discharged from compressor recovery systems of oil cracking plants. In vapor-phase methods of cracking oil, cracking temperatures in excess of 1000° F. are frequently utilized. These cracking temperatures have been found to produce motor fuels having many advantageous characteristics which render the fuels peculiarly suitable for modern internal combustion engine design. However, since such cracking systems are operated at high temperatures a very large quantity of gas is produced and unless this gas is of some economic value, beyond that merely of a gaseous fuel, vapor-phase systems of cracking are handicapped economically in comparison with other types of cracking. The present invention therefore makes use of the gases obtained particularly from a vapor-phase system and by converting such gases into liquid products which may be sold as gasoline the economic value and results obtained from a vapor-phase system are correspondingly increased. In fact, I have found that by the employment of the present invention in connection with a vapor-phase cracking system the total quantity of liquid motor fuel recovered from a given amount of charging stock entering the system exceeds the normal recovery of liquid motor fuel obtained from standard types of liquid phase cracking systems. The present invention provides for a method of polymerization which functions continuously and without any appreciable carbon formation. Further, the operation of the system is substantially automatic.

This application is a continuation in part of my copending application Serial No. 333,756 filed January 19, 1929, which has eventuated into Patent No. 2,028,886.

What is claimed is:

1. The method of polymerizing unsaturated hydrocarbon permanent gases obtained from vapor phase cracking of hydrocarbon oils, which comprises passing such gases, in the absence of added hydrogen, thru a heated reaction zone of restricted cross-sectional area and therein heating said gases to a temperature between approximately 800° F. and approximately 1000° F. while under a pressure of 300 to 1000 pounds per square inch to produce exothermic polymerization reactions, then cooling and condensing the products of such reactions without substantial release of pressure thereon, separating the condensed liquids from the lean gases, and stabilizing the condensed liquids by removing therefrom those components which are gases at ordinary temperatures and pressures.

2. The method of polymerizing unsaturated hydrocarbon permanent gases obtained from vapor phase cracking of hydrocarbon oils, which comprises passing such gases, in the absence of added hydrogen, thru a heated reaction zone of restricted cross-sectional area and therein heating said gases to a temperature between approximately 800° F. and approximately 1000° F. while under a pressure of 300 to 1000 pounds per square inch to produce exothermic polymerization reactions, then cooling and condensing the products of such reactions without substantial release of pressure thereon, separating the condensed liquids from the lean gases, stabilizing the condensed liquids by removing therefrom those components which are gases at ordinary temperatures and pressures, and returning to the reaction zone the gases produced by such stabilization.

3. The method of polymerizing unsaturated hydrocarbon permanent gases obtained from vapor phase cracking of hydrocarbon oils, which comprises passing such gases, in the absence of added hydrogen, thru a heated reaction zone of restricted cross-sectional area and therein heating said gases to a temperature between approximately 800° F. and approximately 1000° F. while under a pressure of 300 to 1000 pounds per square inch to produce exothermic polymerization reactions, then cooling and condensing the products of such reactions without substantial release of pressure thereon, separating the condensed liquids from the lean gases, and stabilizing the condensed liquids by removing therefrom those components which are gases at ordinary temperatures and pressures, said unsaturated hydrocarbon permanent gases when initially entering the reaction zone being brought into heat exchanging relationship with relatively high temperature furnace gases and when leaving said reaction zone into heat exchanging relationship with relatively low temperature furnace gases.

4. The method of polymerizing unsaturated hydrocarbon permanent gases obtained from vapor phase cracking of hydrocarbon oils, which comprises passing such gases, in the absence of added hydrogen, thru a heated reaction zone of restricted cross-sectional area and therein heating said gases to a temperature between approximately 800° F. and approximately 1000° F. while under a pressure of 300 to 1000 pounds per square inch to produce exothermic polymerization reactions, then cooling and condensing the products of such reactions without substantial release of pressure thereon, separating the condensed liquids from the lean gases, and stabilizing the condensed liquids by removing therefrom those components which are gases at ordinary temperatures and pressures, and controlling the said exothermic reaction temperatures of the hydrocarbon gases within said reaction zone by subjecting the outlet portions of said zone to temperatures lower than the inlet portions thereof.

5. In a process for obtaining low boiling point hydrocarbon liquid polymers predominantly of the motor fuel range from olefinic hydrocarbon gases, continuously compressing said gases to a pressure of the order of 500 to 1000 pounds per square inch, subsequently passing said gases under such pressure, in the absence of added hydrogen, through an elongated passageway of restricted cross sectional area while heating the gases therein to a temperature sufficient to initiate polymerization of said gases, then passing said gases through a reaction zone under said pressure, maintaining the gases in said zone for a period of time sufficient to obtain an exothermic reaction and at temperatures between 700 and 1000° F. and preventing excessive rise in temperature in said reaction zone, and then separating low boiling point liquid polymers so produced.

6. In a process for obtaining low boiling point hydrocarbon liquid polymers of the motor fuel range from predominantly unsaturated olefinic hydrocarbon gases, continuously compressing said gases to a pressure between 500 and 1000 pounds per square inch, subsequently passing said gases under such pressure, in the absence of added hydrogen, through a passageway of restricted cross sectional area defining a primary zone while heating the gases therein to a temperature sufficient to initiate polymerization of said gases, then passing said gases under such pressure through a secondary zone while maintaining the gases in said secondary zone at a temperature between 700 and 1000° F. to obtain an exothermic reaction under controlled thermal conditions, and then separating low boiling point liquid polymers so produced.

7. In a process for obtaining low boiling point hydrocarbon liquid polymers predominantly of the motor fuel range from olefinic hydrocarbon gases, continuously compressing said gases to an operative pressure in excess of 500 pounds per square inch but below an unduly high inoperative pressure, passing said gases under such pressure, in the absence of added hydrogen, through a passageway of restricted cross-sectional area while heating the gases therein to a temperature sufficient to initiate polymerization of said gases, then passing said gases through a main reaction zone under said pressure and maintaining the gases in said zone for a period of time sufficient to obtain an exothermic reaction and at temperatures between 700 and 1000° F. without introducing any extraneous heat into the zone, and then separating low boiling liquid polymers so produced.

8. In a process for obtaining low boiling point hydrocarbon liquid polymers predominantly of the motor fuel range from olefinic hydrocarbon gases, continuously compressing said gases to a high superatmospheric pressure up to approximately 1000 pounds per square inch, subsequently passing said gases under such pressure, in the absence of added hydrogen, through an elongated passageway of restricted cross sectional area while heating the gases therein to a temperature sufficient to initiate polymerization of said gases, then passing said gases through a secondary zone under said pressure, maintaining the gases in said zone for a period of time sufficient to obtain an exothermic reaction and at temperatures between 700 and 1000° F. without introducing any extraneous heat into the zone, and then separating low boiling point liquid polymers so produced.

9. In a process for obtaining low boiling point hydrocarbon liquid polymers predominantly of the motor fuel range from olefinic hydrocarbon gases, continuously compressing said gases to a pressure between 500 and 1000 pounds per square inch, subsequently passing said gases under such pressure, in the absence of added hydrogen, through an elongated passageway of restricted cross sectional area while heating the gases therein to a temperature sufficient to initiate polymerization of said gases, then passing said gases through a reaction zone under said pressure while maintaining the gases in said zone for a period of time sufficient to obtain an exothermic reaction and at temperatures between 800 and 1000° F. without introducing any extraneous heat into the zone, and then separating low boiling point liquid polymers so produced.

10. In a process for obtaining low boiling point hydrocarbon liquid polymers of the motor fuel range from predominantly unsaturated olefinic hydrocarbon gases, continuously compressing said gases to a pressure between 500 and 1000 pounds per square inch, subsequently passing said gases under such pressure, in the absence of added hydrogen, through a passageway of restricted cross sectional area defining a primary zone while heating the gases therein to a temperature sufficient to initiate polymerization of said gases, then passing said gases under said pressure and at a temperature between 700° F. and 1000° F. through a secondary zone to obtain an exothermic reaction, maintaining an operative temperature of exothermic reaction in said secondary zone at said pressure, and then separating low boiling point liquid polymers so produced.

11. In a process for obtaining low boiling point hydrocarbon liquid polymers predominantly of the motor fuel range from olefinic hydrocarbon gases, continuously compressing said gases to a pressure between 500 and 1000 pounds per square inch, subsequently passing said gases under such pressure, in the absence of added hydrogen, through a primary zone while heating the gases therein to a temperature sufficient to initiate polymerization of said gases, then passing said gases through a secondary zone protected against excessive heating and cooling, maintaining said gases in said secondary zone at said pressure and for a period of time sufficient to obtain an exothermic reaction and at temperatures between 700 and 1000° F., and then separating low boiling liquid polymers so produced.

12. A continuous process for producing liquid hydrocarbons predominantly of the motor fuel range from hydrocarbon gases which comprises heating hydrocarbon gases in the absence of added hydrogen, containing sufficient unsaturated hydrocarbons to give an exothermic reaction accompanied by rise in temperature under the conditions of temperature and pressure herein specified in a heating zone, maintaining said gases in a reaction zone at a pressure between 300 and 1,000 pounds per square inch and at a temperature not substantially in excess of 1,000° F., but sufficient to promote the exothermic reaction of the gas, by the heat of reaction, for a period of time sufficient to convert a substantial proportion of the gases to normally liquid hydrocarbons, and separating the liquid and gaseous products of the reaction.

13. Process in accordance with claim 12 in which the gases are maintained between 500 and 1,000 pounds per square inch and at a temperature between 800° and 1,000° F. in the absence of added hydrogen.

14. A continuous non-catalytic process for the conversion of gases containing sufficient olefinic hydrocarbons to give an exothermic reaction accompanied by rise in temperature under the conditions of temperature and pressure herein specified which comprises heating the gases under superatmospheric pressure in the absence of added hydrogen to enable them to attain a temperature in excess of 800° F. but not substantially in excess of 1,000° F., maintaining the gases in a reaction zone at a pressure between 300 and 1,000 pounds per square inch, and above 800° F. but not substantially above 1,000° F., by the exothermic heat of the reaction, for a period of time sufficient to convert a substantial portion of the gases to liquid hydrocarbons boiling within the gasoline range, and separating the liquid from the gaseous conversion products.

15. A continuous process for converting hydrocarbon gases rich in olefine gases into hydrocarbons of higher molecular weight which comprises heating said gases in a restricted stream to a temperature sufficient to initiate polymerization of the olefinic hydrocarbons by means of hot products of combustion, then passing the reacting gases under conditions of temperature and pressure suitable for polymerization of said gases through a reaction zone in heat exchange relation with combustion gases at a lower temperature than the temperature of the reacting gases whereby to prevent excessive rise of temperature due to the exothermic reaction of said gases, cooling the reaction products and separating the gases from the remaining products.

CARY R. WAGNER.